Figure 1:
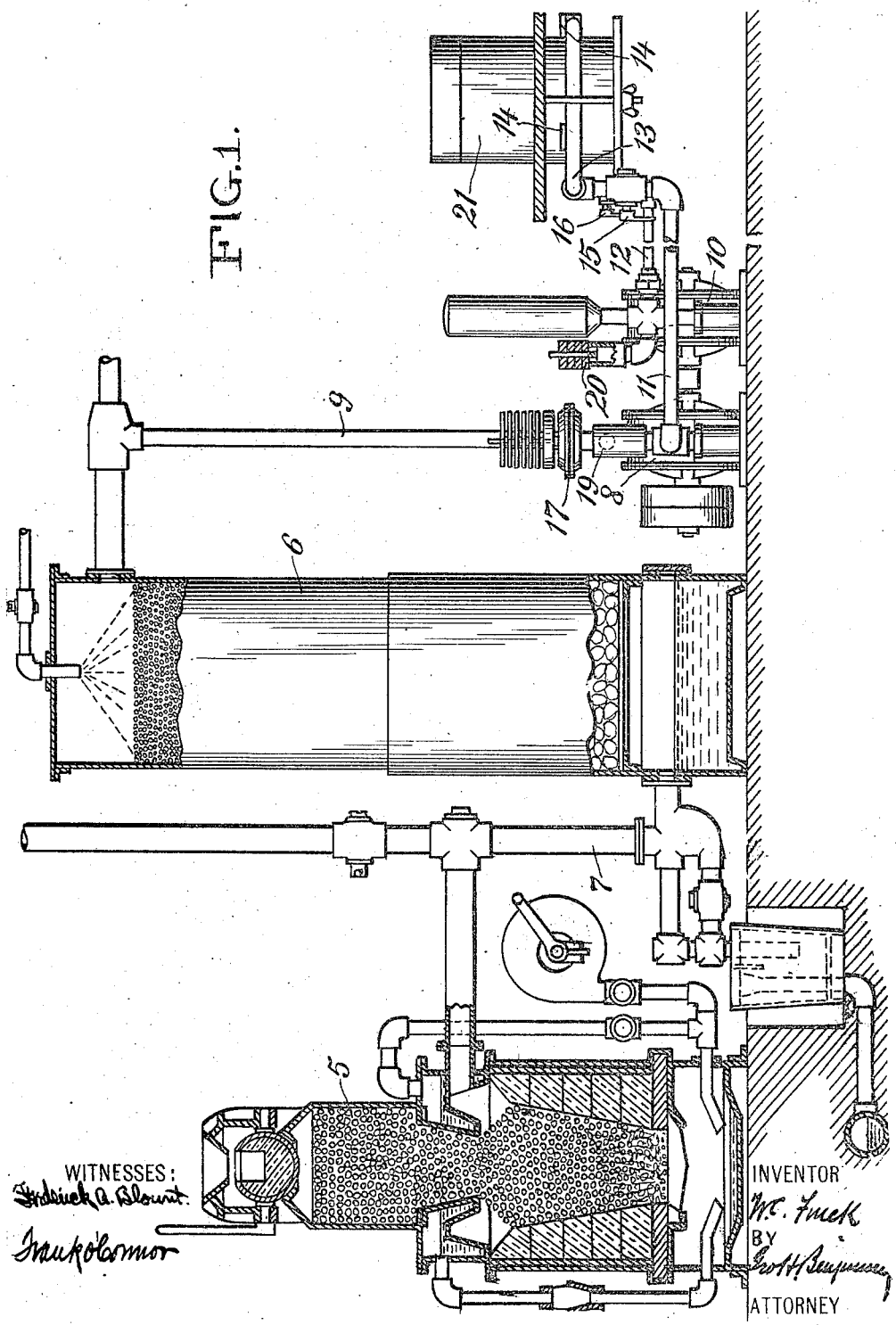

W. C. FINCK.
APPARATUS FOR GENERATING HIGH TEMPERATURES.
APPLICATION FILED DEC. 27, 1906.

1,013,593.

Patented Jan. 2, 1912.

2 SHEETS—SHEET 1.

WITNESSES:

INVENTOR

BY

ATTORNEY

W. C. FINCK.
APPARATUS FOR GENERATING HIGH TEMPERATURES.
APPLICATION FILED DEC. 27, 1906.
Patented Jan. 2, 1912.
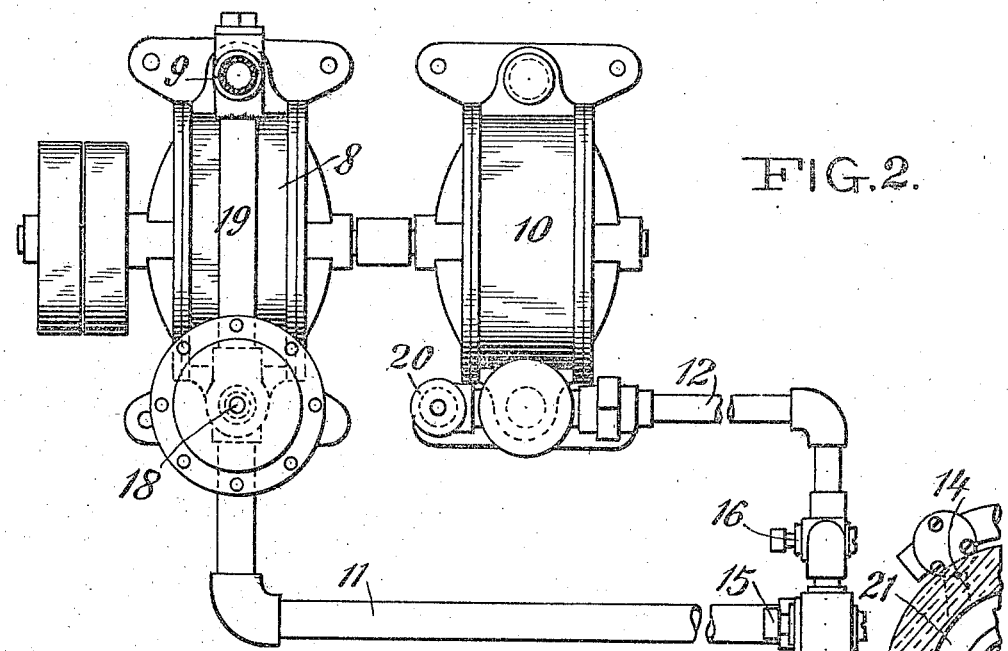
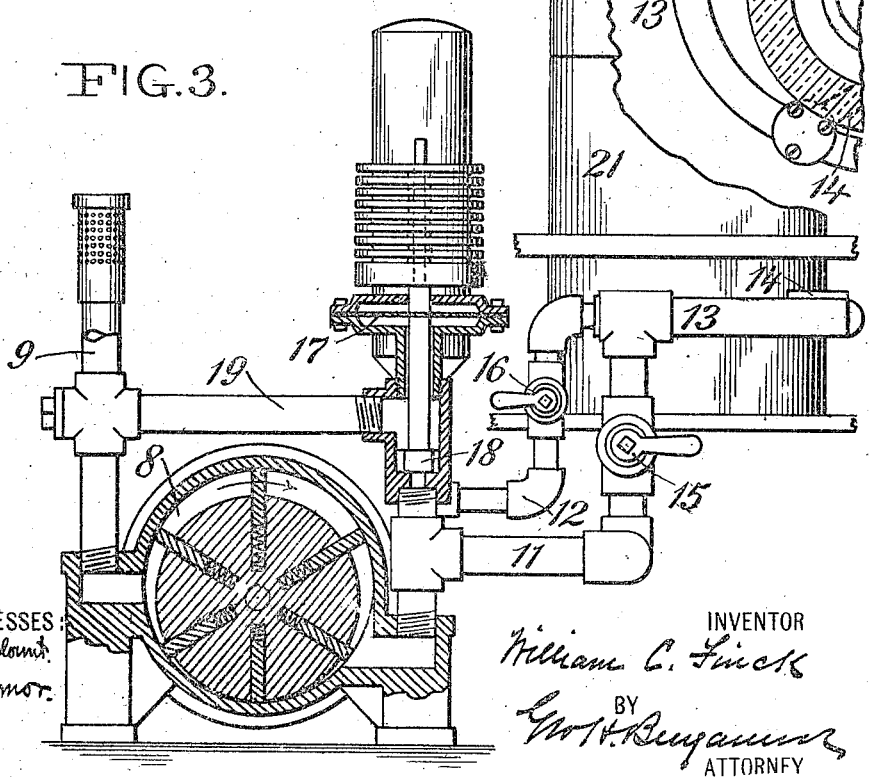

UNITED STATES PATENT OFFICE.

WILLIAM CHRISTIAN FINCK, OF ELIZABETH, NEW JERSEY, ASSIGNOR TO GEORGE H. BENJAMIN, OF NEW YORK, N. Y.

APPARATUS FOR GENERATING HIGH TEMPERATURES.

1,013,593.  Specification of Letters Patent.  Patented Jan. 2, 1912.

Application filed December 27, 1906. Serial No. 349,604.

*To all whom it may concern:*

Be it known that I, WILLIAM CHRISTIAN FINCK, a citizen of the United States, residing at Elizabeth, county of Union, State of New Jersey, have invented an Apparatus for Generating High Temperatures, of which the following is a specification.

My invention, broadly stated, consists in generating a gas containing a high percentage of carbon, transmitting such gas to a burner under a definite pressure and supplying air to said burner under a definite pressure, the pressures of gas and air being substantially in the ratio of one to one and a quarter and igniting the resultant mixture.

The object of my invention is the instantaneous production of an extremely high temperature which may be readily handled and controlled at will.

To carry my invention into effect, I may use apparatus such as is disclosed in the accompanying drawings which may be considered diagrammatic or otherwise illustrative of a combination of certain types of apparatus which may be employed.

Figure 1 is a side elevation and section. Fig. 2, a plan of the gas and air pumps, and a part of the furnace. Fig. 3, a vertical section through the gas pump with the air pump shown in partial elevation and the furnace chamber in elevation.

In the drawings 5 indicates a gas producer of the type adapted to produce a semi-water gas. The producer shown in the drawings is that known as the "Otto" type which construction is now well known and need not be specifically described. I wish it understood that I do not in any wise limit myself to the character of the producer or the gas which may be produced thereby.

Considered theoretically, an apparatus which will produce a gas, high in carbon and hydrogen, will accomplish the best results. In practice, however, I have found that an apparatus which will generate a gas high in carbon will, in a measure, serve the purpose. In experiments which I have made, I have produced gas from a great variety of substances, such, for instance, as hard and soft coal, sawdust, vegetable waste,—such as leaves or factory sweepings. I mention these facts in order to have it understood that I do not in any wise limit myself to the apparatus used in producing the gas, or the material acted upon to produce the gas.

6 indicates a scrubber, which is connected to the producer through the pipe 7. A scrubber is not essential. I have made use of it in order to purify the gas and free it from tarry and other matters which affect the quality of gas delivered at the burners. The form of scrubber shown is one common in the art and need not be described.

8 indicates a gas pump which is connected to the top of the scrubber through a pipe 9. 10, an air pump. 11, a pipe leading from the eduction orifice of the gas pump to the pipe 13. 12, a pipe leading from the eduction orifice of the air pump to the pipe 13. 14, burners connected to the pipe 13. 15, valve in pipe 11. 16, valve in pipe 12.

I do not limit myself in any wise to the character of the apparatus employed to deliver the gas and air under pressure to the burners. Thus I may use pumps, compressing apparatus, inspirators, and other apparatus which will effect the result stated.

In practice I prefer that the pressure of the gas and air delivered shall maintain a uniform relation as regards each other, and to accomplish this, the gas and air pumps are provided with regulating valves. Such a regulating valve for the gas pump 8 consists of a weighted diaphragm 17 controlling a valve 18 which controls a bypass 19. Such a regulating valve for the air pump 10 consists of a weighted valve 20 which is situated in the top of the pipe 12, attached to the eduction orifice of the air pump. In practice I have found that the best results can be obtained by delivering gas to the pipe 13 at a pressure of one pound to the square inch and air at a pressure of one and one-quarter pounds to the square inch. I wish it understood that I do not limit myself to the respective pressures stated. It is possible and probable that these pressures may be varied. It has not been practicable for me to experiment beyond the pressures stated. There is, however, apparently no reason why these pressures may not be varied or relatively altered.

The temperature, as produced by the burners, may be utilized in any apparatus. In the drawings I have shown an ordinary circular heating chamber 21, built of fire brick, around the exterior of which is carried a pipe 13, from which inwardly extend burners 14. Manifestly, the construction of the apparatus in which the heat is to be applied will depend upon the use to which it is put.

The operation of my device is as follows: The valve 15 in the gas pipe 11 is first opened, and the gas ignited at the burner orifices 14. As soon as the interior of the furnace is slightly warmed, the valve 16 in the pipe 12 is opened. As soon as this latter valve is opened, the temperature rises and within a very few seconds becomes intense, ranging from 1200 to 3000 degrees F., depending upon the value of the gas delivered in carbon and hydrogen. While I am not able to state the theoretical reasons for the high temperature produced, it apparently is due to the fact that instantaneous combustion of the combustible elements of the gas and air takes place at the burner orifices. This would appear to be proved by the fact that in the furnace there is no evidence of rolling flame and no deposit of carbon. Such flame as exists takes the form of a green flame, thereby differing from the old yellow and blue flames found in ordinary or oxyhydrogen furnaces.

I claim as my invention:

1. In an apparatus for generating high temperatures, the combination of a gas producer, a combustion chamber, means for delivering gas and air into said chamber under pressure for effecting instantaneous combustion therein.

2. In an apparatus for generating high temperatures, the combination of a gas producer, a combustion chamber, means for delivering gas and air into said chamber at definite pressures substantially in the ratio of one to one and one-quarter for effecting instantaneous combustion therein.

3. In an apparatus for generating high temperatures, the combination of a gas producer adapted to generate a gas containing free hydrogen and carbon monoxid, a combustion chamber, means for delivering the produced gas and air into said chamber at definite pressures substantially in the ratio of one to one and one-quarter for effecting instantaneous combustion therein.

4. In an apparatus for generating high temperatures, the combination of a gas producer producing semi-water gas, a combustion chamber, means for transmitting said water-gas to a burner under a definite pressure, means for supplying air to said burner under definite pressure, the pressures of gas and air being substantially in the ratio of one to one and one-quarter for effecting instantaneous combustion at such burner orifice.

5. In an apparatus for generating high temperatures, the combination of a gas producer, a combustion chamber, a gas pump, an air pump, a burner, interposed piping between the gas producer, the gas pump, the air pump and the burner whereby the gas and air are delivered to the burner in a mixed state, the pressure of gas and air being substantially in the ratio of one to one and one-quarter, whereby instantaneous combustion will take place at the burner orifice.

In testimony whereof, I affix my signature, in the presence of two witnesses.

WILLIAM CHRISTIAN FINCK.

Witnesses:
E. M. WHEELER,
FRANK O'CONNOR.